(12) United States Patent
Shapiro (10) Patent No.: US 12,332,904 B2
(45) Date of Patent: Jun. 17, 2025

(54) METHOD AND SYSTEM FOR ANALYZING A DATA SET BASED ON RANKING OF OBSERVATIONS

(71) Applicant: Josh Shapiro, Smyrna, GA (US)

(72) Inventor: Josh Shapiro, Smyrna, GA (US)

( * ) Notice: Subject to any disclaimer, the term of this patent is extended or adjusted under 35 U.S.C. 154(b) by 0 days.

(21) Appl. No.: 18/234,301

(22) Filed: Aug. 15, 2023

(65) Prior Publication Data

US 2024/0061848 A1 Feb. 22, 2024

Related U.S. Application Data

(60) Provisional application No. 63/399,765, filed on Aug. 22, 2022.

(51) Int. Cl.
*G06F 16/2457* (2019.01)
*G06F 16/28* (2019.01)

(52) U.S. Cl.
CPC ...... *G06F 16/24578* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 10,241,969 B2 * | 3/2019 | Akitomi | G06F 17/15 |
| 2004/0227759 A1 * | 11/2004 | McKnight | G06T 11/206 |
| | | | 345/440 |
| 2016/0124960 A1 * | 5/2016 | Moser | G06T 11/206 |
| | | | 707/723 |

OTHER PUBLICATIONS

Nanine A.E. van Gennip; Peer assessment as a collaborative learning activity: The role of interpersonal variables and conceptions; 2010; pp. 1-11.*

* cited by examiner

*Primary Examiner* — Ann J Lo
*Assistant Examiner* — Jermaine A Mincey
(74) *Attorney, Agent, or Firm* — Boris Leschinsky (57) ABSTRACT

A system and method for analysing a data set based on ranking of observations is disclosed. The method includes uploading the data set by a user and selecting one or more significant variables in the data set that interests the user and represents a priority & focus of a study. The method further includes automatically selecting an appropriate statistical technique based on the type of the variable for performing a correlation analysis for measuring an interdependence of one or more variables associated with the data set and assessing a magnitude of the relationship between the one or more variables. The method further includes performing a correlation for generating one or more correlation results. The method further includes returning a list of key analysis to the user, based on the one or more significant variables and the one or more correlation results.

20 Claims, 7 Drawing Sheets

Characterize Data for SASApp:CANDY_SALES_SUMMARY 2 of 3  Select the report options Output Types ✓ Summary_Report ✓ Graphs ✓ SAS Data Sets Frequency Data:

SAS server: SASApp

Library:    WORK                                    Browse

Data set:   FREQCHARFREQUENCYFORCANDY_SALES_

UNVARIANT Data:

SAS server: SASApp

Library:    WORK                                    Browse

Data set:   UNIVCHARUNIVARIATEFORCANDY_SALES_

[Back] [Next] [Finish ▶] [Cancel] [Help]

FIG. 2B

Top observations

| Variable(s) | Observation(s) |
|---|---|
| Age | This variable has high level of precision, in that respondents tend to answer with a minimal range of variation. |
| Age_rec | This variable has high level of precision, in that respondents tend to answer with a minimal range of variation. |
| Age & Age_rec | When Age increase, the values for Age_rec increases (Relationship strength is Very Strong) |
| Education & Education_num | There is a relationship between Education and Education_num, and at least one median Education_num value is dependent on the other value. (Relationship strength is Very Strong) |
| Education & income | At times, the average value for income is dependent on the value of Education ( Relationship strength is Very Strong) |

|   | 18-25 | 26-33 | 34-41 | 42-49 |
|---|---|---|---|---|
| Age | 10% | 19% | 33% | 18% |

General Observations

- The value with the greatest number of responses are 34-41.
- Responses would have conformed to a symmetrical distribution, expect for values that were skewed to the higher range of age.
- This variable has a high level of precision, in that respondents to answer with a minimal range of variation.

Discover Hidden Trends & Relationships

| Variables | Strength | Relationship | Action |
|---|---|---|---|
| Amount of sugar | Strong | There is statistical relationship between Preferred Flavor and Amount of Sugar (*not independent of each other*) | 🔍 |
| Amount of Caffeine | Strong | There is statistical relationship between Preferred Flavor and Amount of Caffeine (*not independent of each other*) | 🔍 |
| Amount of Calories | Strong | When Amount of Sugar increases, the values for Amount of Calories *increases* | 🔍 |
| Amount of Calories | Weak | When Amount of Caffeine increases, the values for Amount of Calories *decreases* | 🔍 |
| Amount of sugar | Weak | When Amount of Caffeine increases, the values for Amount of Sugar *decreases* | 🔍 |

METHOD AND SYSTEM FOR ANALYZING A DATA SET BASED ON RANKING OF OBSERVATIONS

CROSS-REFERENCE TO RELATED APPLICATIONS

This application claims priority to U.S. provisional patent application No. 63/399,765 filed on Aug. 22, 2022, the complete disclosure of which, in its entirely, is herein incorporated by reference.

BACKGROUND

Technical Field

The embodiments herein generally relate to data analysis, and more particularly, provides a method and system for analyzing a data set based on ranking of observations.

Description of the Related Art

Currently, several known statistical analysis tools partially allow many to many correlation analysis and select the most appropriate correlation technique based on the var types (such as analysis of variance (ANOVA), Pearson's, and the like) and explain result in plain language. Although software as a service (SAS) technology is complex, may require code from user, allows continuous or dichotomical variables (e.g., 0/1) but not categorical with more than two choices. Additionally, the currently known technology returns Pearson's and P-value results not explained in plain language. Moreover, technologies such as smart tables from Q software conducts relationships (one to many) and then output crosstab reports ranked by correlation strength. It is a way in which the user can create multiple crosstabs and then have all the resulting reports ranked in a way of identifying those that are meaningful as they present higher correlation. However, the smart tables from Q software do not use magni-tudes to rank relationships. Moreover, the currently known technologies do not rank relationships based on factors other than p-value.

Hence, there is a long felt need for a system and a method for analyzing data set based on ranking of observations, and deciding which should be shown to the user, while addressing the above-recited problems associated with the related art. The system enables user to under-stand data proactively (system proactively gives insights to the user instead of user having to look for insights in the system).

The above-mentioned shortcomings, disadvantages and problems are addressed herein, and will be understood by reading and studying the following specification.

SUMMARY

This summary is provided to introduce a selection of concepts in a simplified form that are further disclosed in the detailed description. This summary is not intended to determine the scope of the claimed subject matter.

The present technology performs a correlation analysis using a variety of correlation techniques and automatically picks the correct statistical technique based on the variable type (e.g., numerical versus categorical), in order to measure both the independence (or relationship) between the variables and the magnitude (strength) of that relationship. The present system selects the best technique (to test independence and/or magnitude) without user inter-vention. Additionally, the present system selects the related variables (related to the variables selected by the user) and all other important variables in a single process.

In an aspect, a processor-implemented method of analyzing a data set is provided. The method includes uploading the data set by a user and selecting, by the user, one or more significant variables in the data set that interests the user and represents a priority & focus of a study. The method further includes automatically selecting based on the type of the variable, by a processor, an appropriate statistical technique based on the type of the variable for performing a correlation analysis for measuring an interdependence of one or more variables associated with the data set and assessing a magnitude of the relationship between the one or more variables. The method further includes performing, by the processor, a correlation for generating one or more correlation results including at least one of a first set of variables related to the one or more significant variables and a second set of variables related to the first set of variables. The method further includes returning, by the processor, a list of key analysis to the user, based on the one or more significant variables and the one or more correlation results, whereby the list of key analysis provides an insight to the user about the data set.

According to an embodiment, the list of key analysis describes at least one of frequencies, correlation, regression, benchmark reports, and recommended clusters, and the list of key analysis is in the form of at least one of a summary table, a set of charts, data tables, and plain language explanation.

According to an embodiment, the interdependence of the variables is used as an indicator of whether one or more variables are related to the one or more significant variables selected by the user.

According to an embodiment, the method further includes assigning, by the processor, individual weights to the first set of variables, the second set of variables and the one or more significant variables, observation type and analysis result based on at least the variable type.

According to an embodiment, performing the correlation includes ranking the observations in an order of relevance by includes classifying one or more variable observations associated with the data set based on at least one of significance to the user, the variable type, the observation nature, and the observation result. The method further includes generating a list of observations and insights based on the classification. The method further includes ranking the list of observations based on a series of weights that are based on pre-defined factors by running a relate process with one or more $1^{st}$, $2^{nd}$ and $3^{rd}$ degree variables and collecting resulting observations and compiling the observations across the data set for the one or more $1^{st}$, $2^{nd}$, and $3^{rd}$ degree variables and ranking the observations by assigning a score to each observation. As used herein the term "$1^{st}$ degree variable" refers to variables that are chosen by the user, the term "$2^{nd}$ degree variable" refers to variables have relationships with 1st Degree vars, with a magnitude of very strong, strong, the term "3rd degree variable" refers to variables that have relationships with the $2^{nd}$ degree variables, with a magnitude of very strong. The $3^{rd}$ degree variables could also have relationships with $1^{st}$ degree variables that are moderate in strength.

According to an embodiment, the ranking score is given by:

$$Ranking\_Score = (Score/Value\_Range) * Factor\_Weight$$

The Ranking_Score is assigned to each observation and the observations are ordered with the greatest Ranking_Score first.

According to an embodiment, the method further includes selecting a task and a describe option by the user and selecting a characterize data option by the user for characterizing the data.

According to an embodiment, the method further includes creating, by the processor, a list of meaningful observations that are equal to or higher than a predetermined score threshold, based on the list of key analysis.

According to an embodiment, the correlation is performed based on a p-value to determine if a relationship exists between the variables and if an existing relationship is one of: statistically significant or not statistically significant.

According to an embodiment, wherein the observations are presented to the user in the order of importance, with the most important observations presented first and based on sorting via the processor.

In another aspect, a system for analyzing a data set based on ranking of observations is provided. The system includes a memory includes one or more executable modules and a processor configured to execute the one or more executable modules for analyzing the data set based on ranking of observations, the one or more executable modules includes a data module for receiving the data set and a selection of one or more significant variables in the data set that interests the user and represents a priority & focus of a study, from the user. In some embodiments, the one or more modules may be positioned outside the memory, for example, on a remote server and may be accessed via a network by the system. The one or more executable modules further includes a selection module for automatically selecting, based on the type of the variable, an appropriate statistical technique for performing a correlation analysis for measuring an interdependence of one or more variables associated with the data set and assessing a magnitude of the relationship between the one or more variables. The one or more executable modules further includes a correlation module for performing a correlation for generating one or more correlation results comprising at least one of: a first set of variables related to the one or more significant variables, and a second set of variables related to the first set of variables. The one or more executable modules further includes an analysis module for returning a list of key analysis, to the user, based on the one or more significant variables and the one or more correlation results, whereby the list of key analysis provides an insight to the user about the data set.

According to an embodiment, the list of key analysis describes at least one of frequencies, correlation, regression, benchmark reports, and recommended clusters, and the list of key analysis is in the form of at least one of a summary table, a set of charts, data tables, and plain language explanation.

According to an embodiment, the interdependence of the variables is used as an indicator of whether one or more variables are related to the one or more significant variables selected by the user.

According to an embodiment, the system further includes a weight assignment module for assigning individual weights to the first set variables, the second set of variables and the one or more significant variables, observation type and analysis result based on at least the variable type.

According to an embodiment, performing the correlation includes ranking the observations in an order of relevance includes classifying one or more variable observations associated with the data set based on at least one of significance to the user, the variable type, the observation nature, and the observation result, generating a list of observations and insights based on the classification. The ranking the list of observations based on a series of weights that are based on pre-defined factors by running a relate process with one or more $1^{st}$, $2^{nd}$ and $3^{rd}$ degree variables and collecting resulting observations and compiling the observations across the data set for the one or more $1^{st}$, $2^{nd}$, and $3^{rd}$ degree variables and ranking the observations by assigning a score to each observation.

According to an embodiment, the ranking score is given by the following equation:

Ranking_Score=(Score/Value_Range)*Factor_Weight; and

The Ranking_Score is assigned to each observation and the observations are ordered with the greatest Ranking_Score first.

According to an embodiment, the analysis module is further configured to create a list of meaningful observations based on the list of key analysis. The analysis observations are in plain English language and the observations are presented to the user in the order of importance, with the most important observations presented first and based on sorting via the processor.

According to yet another aspect, a processor-implemented method of performing correlation of one or more variables in a database is disclosed. The method includes receiving an input from a user, the input includes a selection of one or more significant variables of interest to the user. The method further includes performing, by the processor, a correlation for generating one or more correlation results including at least one of: a first set of variables related to the one or more significant variables, and a second set of variables related to the first set of variables, by ranking the observations in an order of relevance by classifying one or more variable observations associated with the data set based on at least one of significance to the user, the variable type, the observation nature, and the observation result, generating a list of observations and insights based on the classification and ranking the list of observations based on a series of weights and generating, by the processor, a list of key analysis based on the correlation results.

According to an embodiment, the ranking score is given by the following equation:

Ranking_Score=(Score/Value_Range)*Factor_Weight; and

The Ranking_Score is assigned to each observation and the observations are ordered with the greatest Ranking_Score first.

According to an embodiment, the correlation is performed based on a p-value to determine if a relationship exists between the variables and if an existing relationship is one of: statistically significant or not statistically significant.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE DRAWINGS

The detailed description of various exemplary embodiments of the disclosure is described herein with reference to the accompanying drawings. It should be noted that the embodiments are described herein in such details as to clearly communicate the disclosure. However, the number of details provided herein is not intended to limit the anticipated varia-tions of embodiments; on the contrary, the intention is to cover all modifications, equivalents, and alternatives falling within the spirit and scope of the present disclosure as defined by the appended claims.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and will be described in detail below. It should be understood, however, that it is not intended to limit the disclosure to the forms disclosed, but on the contrary, the disclosure is to cover all modifications, equivalents, and alternatives falling within the scope of the disclosure.

Various embodiments disclosed herein provide a system and a method of analyzing a data set based on ranking of observations. The system and method of the present technology enables a user to upload data and uses predefined algorithms to identify the trends for the user that would be useful. The system takes a list of observations and insights, and ranks/organizes them based on a series of weights that are based on factors. The present technology uses p-value to determine if a relationship is present and for ranking the present technology measures the effect size or magnitude of that relationship through the selection of the most appropriate technique based on variable types. In several embodiments, the present technology learns, using a predefined algorithm, what the user thinks is important and use that information to prioritize the observations (the weights for ranking observations). In an embodiment, the present technology uses predefined algorithm that has different weights assigned to variables (according to their type, user vs not user selected, related vs not related to user selection, and the like), observation types (e.g., description of a variable frequency versus correlation between two variables) and analysis results (e.g., strong correlation found between variables vs moderate correlation found).

In an embodiment, the system of the present technology finds the most appropriate correlation technique (P-value or R2) based on the variables input, and also finds other significant variables within the data, and then outputs different equations or models that are ranked based on their statistical meaning in terms of how their combination of dependent variables may explain the behavior of the independent variable. The process includes determining the dependent variable and all other possible variables. Subsequently, the process involves taking every combination of independent variables, determining the optimal correlation technique, analyzing, and then looking at the results. Later the process involves obtaining the results of all correlation models running and analyzing p-values and R2 to recommend the top models for the user.

Figure 1:
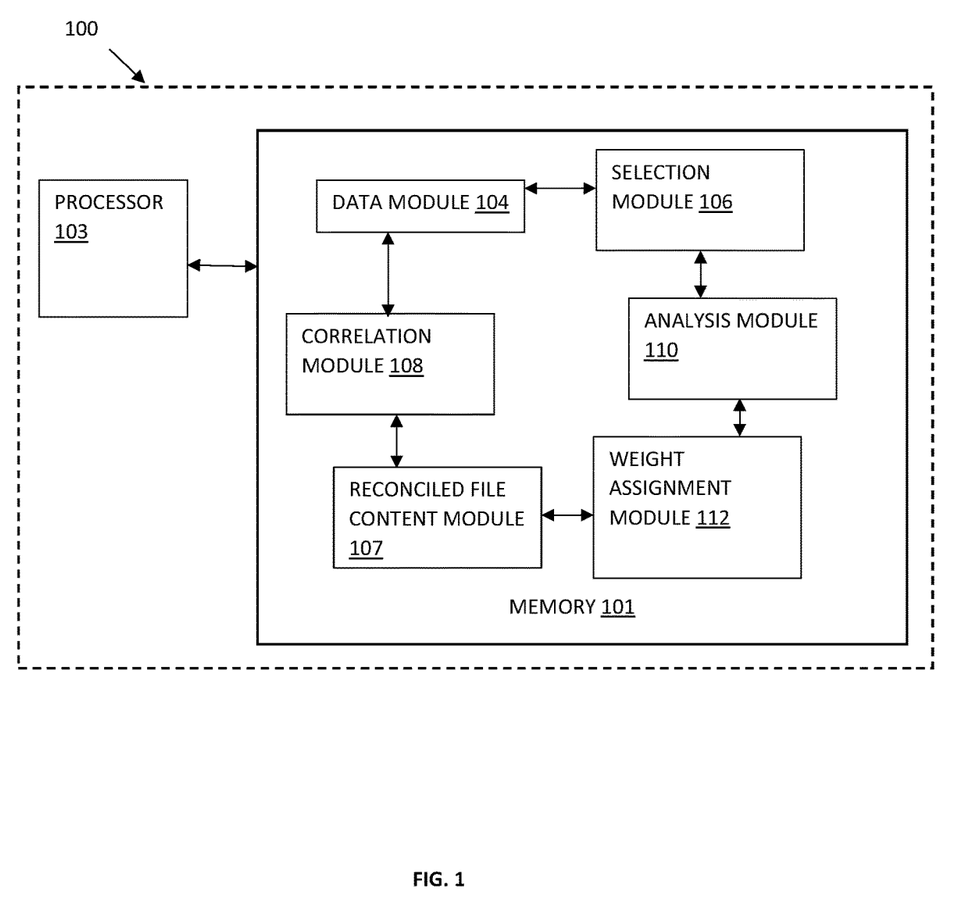
FIG. 1 depicts a system for analyzing a data set based on ranking of observations, in accordance with an embodiment.

FIG. 1 depicts a system 100 for analyzing a data set based on ranking of observations. The system includes a memory 101 includes one or more executable modules and a processor 103 configured to execute the one or more executable modules for analyzing the data set based on ranking of observations. The one or more executable modules includes a data module 104, a selection module 106, a correlation module 108, an analysis module 110, a weight assignment module 112. The data module 104 receives the data set and a selection of one or more significant variables in the data set that interests the user and represents a priority & focus of a study, from the user. The selection module 106 automatically selects, based on the type of the variable, an appropriate statistical technique based on the type of the variable for performing a correlation analysis for measuring an interdependence of one or more variables associated with the data set and assessing a magnitude of the relationship between the one or more variables. The interdependence of the variables is used as an indicator of whether one or more variables are related to the one or more significant variables selected by the user.

In an embodiment, a pair of variables are selected. The types of variables present in that pair are identified. An appropriate technique is assigned according to the variable types and the browsing for variables (select another pair is continued. The variable types are identified and a technique to be run for that pair is assigned and the process is continued until all variables are scanned. Some examples of the technique to be selected according to the types of variables that are to be tested in terms of correlation includes Chi-Squared Test of Independence and t-test.

According to an embodiment, the interdependence of the variables is indicative of whether one or more variables are related to the one or more significant variables selected by the user.

The correlation module 108 performs a correlation for generating one or more correlation results including at least one of: a first set of variables related to the one or more significant variables, and a second set of variables related to the first set of variables. According to an embodiment, the correlation module 108 performs the correlation by ranking the observations in an order of relevance. The ranking is performed by classifying one or more variable observations associated with the data set based on at least one of significance to the user, the variable type, the observation nature, and the observation result, and generating a list of observations and insights based on the classification. Consider for example, if the user selects the "Age" variable as important variable, the system 100 finds the following observations or insights:

1) "Age" is strongly related with "Income" variable
2) "Income" is somehow related with "Gender" variable 3) "Age" is somehow related with "Gender" variable The system 100 returns the observations in the following ranking order 1, then 3, then 2, based on the following criteria:
1) "Age" was a variable selected as "important", thus observations in which this variable is present are of a higher order
2) Observations that found variables to be "strongly related" are of a higher order In an embodiment, the list of observations are ranked based on a series of weights that are based on pre-defined factors by running a relate process with one or more $1^{st}$, $2^{nd}$ and $3^{rd}$ degree variables and collecting resulting observations and compiling the observations across the data set for the one or more $1^{st}$, $2^{nd}$ and $3^{rd}$ degree variables and ranking the observations by assigning a score to each observation. In an embodiment, the individual weights are assigned to the first set variables, the second set of variables and the one or more significant variables, observation type and analysis result based on at least the variable type.

According to an embodiment, the ranking score is given by equation (1):

$$\text{Ranking\_Score} = (\text{Score}/\text{Value\_Range}) * \text{Factor\_Weight} \quad (1)$$

The Ranking_Score is assigned to each observation and the observations are ordered with the greatest Ranking_Score first.

The Ranking score will sort observations from highest score to lowers, as highest are the ones that should be more interesting for the user (because they come from important variables selected by user and/or because the observation is based on a significant result, such as a strong correlation of variables, and/or an important description of the values within a variable, such as values that are highly skewed to the lower/higher numerical range in a continuous variable.

The analysis module 110 returns a list of key analysis and one or more analysis observations, to the user, based on the one or more significant variables and the one or more correlation results, whereby the list of key analysis provides an insight to the user about the data set. According to an embodiment, the list of key analysis describes at least one of frequencies, correlation, regression, benchmark reports, and recommended clusters, and the list of key analysis is in the form of at least one of a summary table, a set of charts, data tables, and plain language explanation.

According to an embodiment, the weight assignment module 112 assigns a plurality of weights to variables, observation type and analysis result. The plurality of weights is based on at least the variable type, whether the variable was picked by user or not, and the results. Consider for example, If the user selects the "Age" variable as important variable, then the system 100 Finds the following observations or insights:
1) "Age" is strongly related with "Income" variable
2) "Income" is somehow related with "Gender" variable
3) "Age" is somehow related with "Gender" variable
4) "Income" variable has values that present a uniform (random like) distribution The system 100 returns the observations in the following ranking order 1, then 3, then 2, and finally 4 based on the following criteria:
1) "Age" was a variable selected as "important", thus observations in which this variable is present are of a higher order;
2) Observations that found variables to be "strongly related" are of a higher order;
3) the result of B4 is of low importance (distribution is random like) and the variable is also of lower importance (was not picked by the user).

According to an embodiment, the analysis module 112 is further configured to create a list of meaningful observations that are equal to or higher than a predetermined score threshold, based on the list of key analysis. The analysis observations are in plain English language and the observations are presented to the user in the order of importance, with the most important observations presented first and based on sorting via the processor. Following is an example of meaningful observations:
A) User selected the "Age" variable as significant variable;
B) System found following observations:
b1) "Age" is strongly related with "Income" variable;
b2) "Income" is somehow related with "Gender" variable;
b3) "Age" is somehow related with "Gender" variable;
b4) "Income" variable has values that present a uniform (random like) distribution;
C) System will return the observations in the following ranking order b1, then b3, then b2, and finally B4. based on the following criteria:
c1) "Age" was a variable selected as "significant", thus observations in which this variable is present are of a higher order;
c2) Observations that found variables to be "strongly related" are of a higher order; and
c3) the result of B4 is of low importance (distribution is random like) and the variable is also of lower importance (was not picked by the user) then this observation will not be considered as meaningful observation.

Figure 2A:
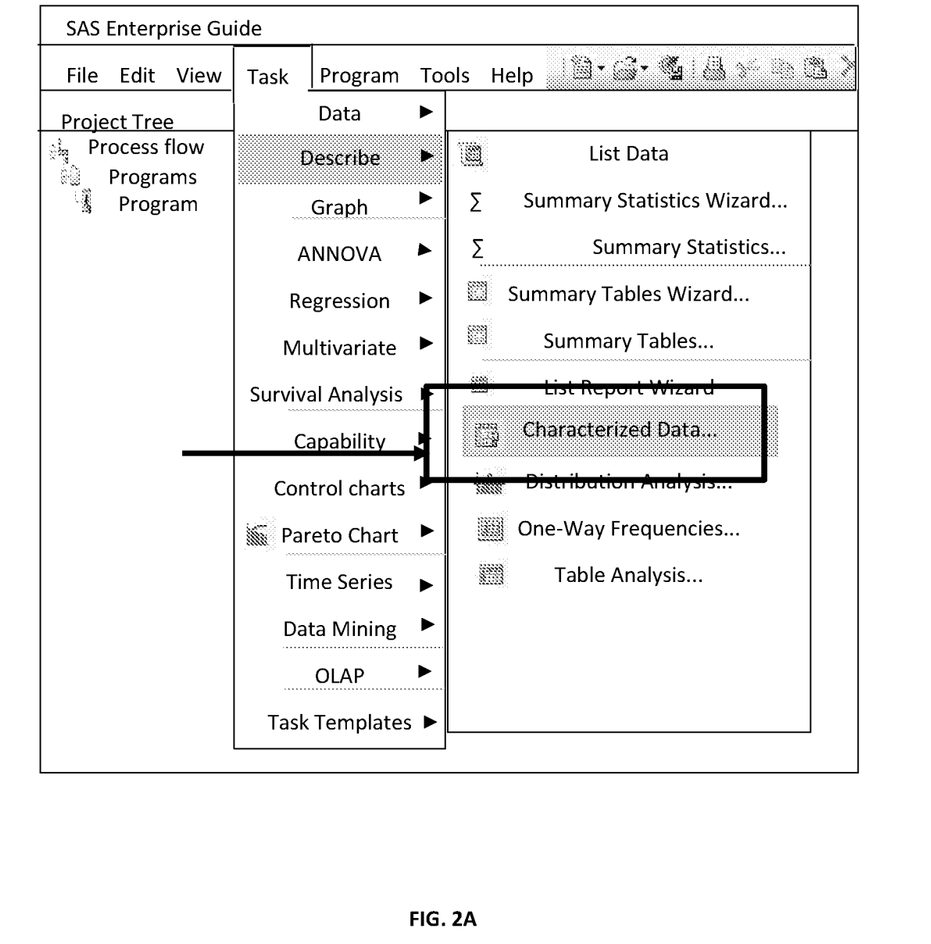
FIG. 2A illustrates a SAS enterprise guide, in accordance with an exemplary scenario.

FIG. 2A illustrates a statistical analysis system (SAS) enterprise guide, in accordance with an exemplary scenario. First, a task is selected by a user. The user then selects a describe option. After selecting the describe option, the characterize data option is selected by the user and the data is characterized.

Figure 2B:
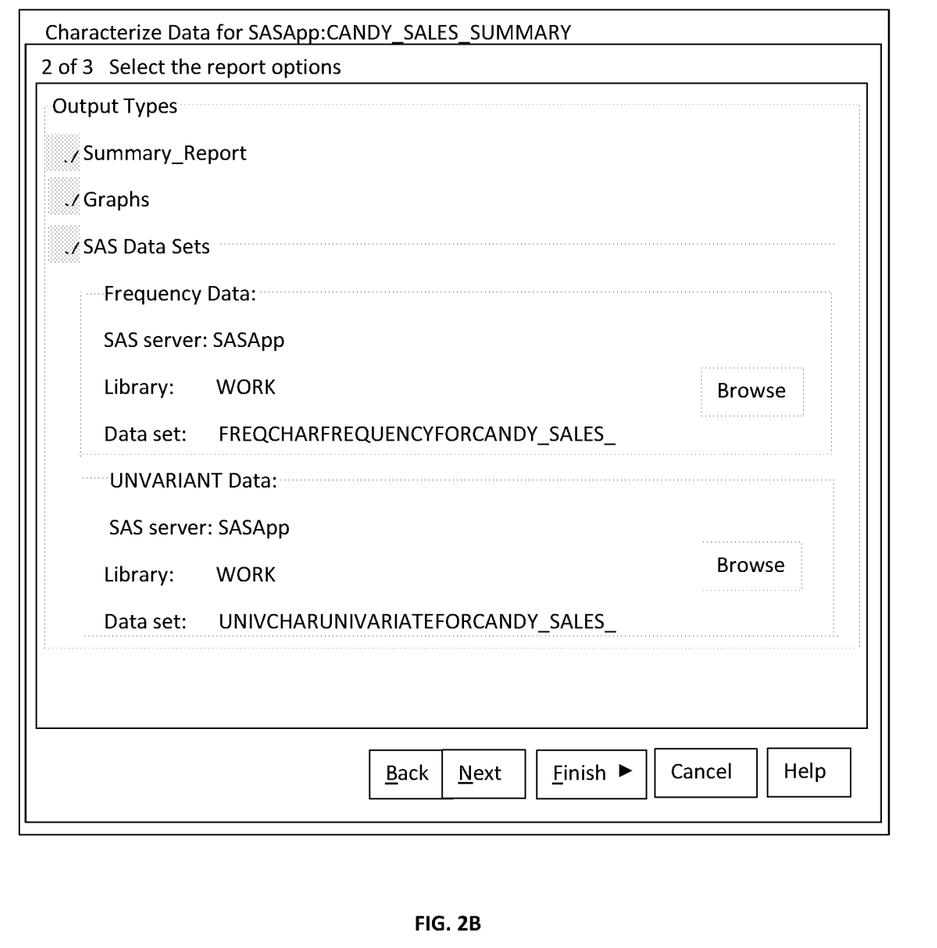
FIG. 2B illustrates a characterization of data for a SAS Application, in accordance with an exemplary scenario.

FIG. 2B illustrates a selection of the report options, in accordance with an exemplary scenario. The output types of the variables are selected by the user. The output types such as summary report, graphs, SAS data sets, and the like are selected. The results return in the way of a summary table, then a set of charts, data tables, and plain language explanation.

Figure 3:
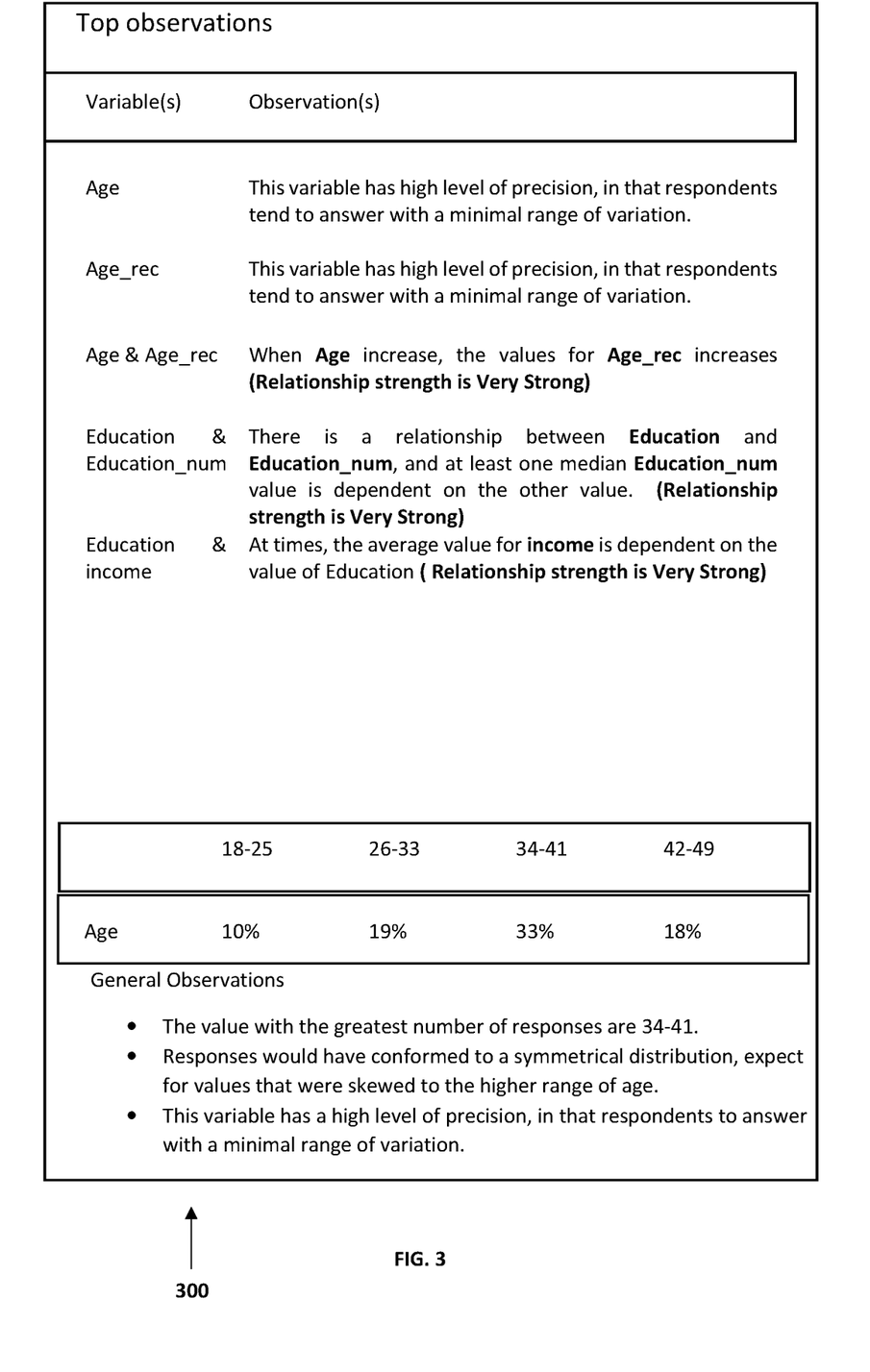
FIG. 3 illustrates results that return in a way of a summary table, then a set of charts, data tables, and plain language explanation, in accordance with an exemplary scenario.

FIG. 3 illustrates results that return in a way of a summary table, in accordance with an exemplary scenario. The system of the present technology takes a list of observations and insights, and ranks/organizes them based on a series of weights that are based on factors. The observations are compiled across the data set. All described observations are compiled for all $1^{st}$, $2^{nd}$, and $3^{rd}$ degree variables. The above process is performed by running a relate process with all $1^{st}$ degree, $2^{nd}$ degree, and $3^{rd}$ degree variables and collecting all observations that result. The observations are fed into a ranking algorithm, for ranking of each observation.

This process is performed by assigning score to each observation.

Figure 4:
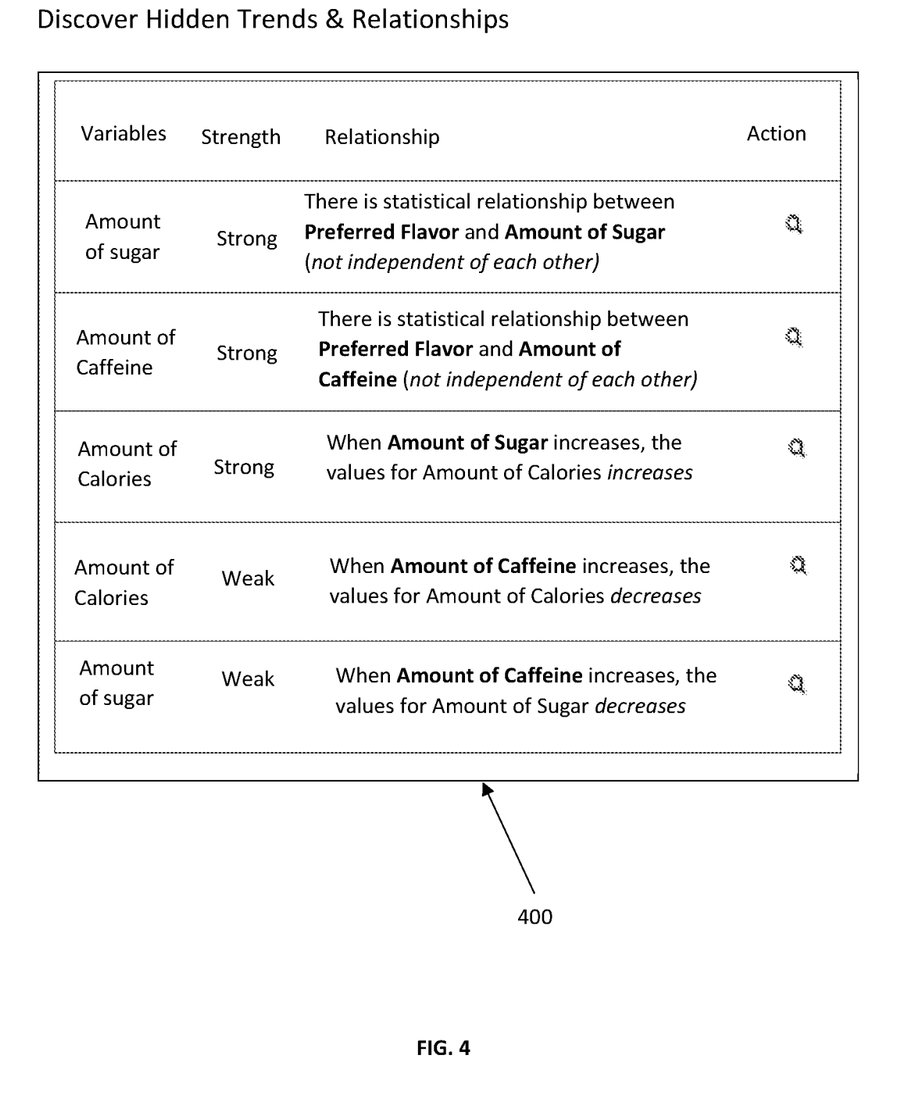
FIG. 4 illustrates the combination of various statistical methods, in accordance with an embodiment.

FIG. 4 illustrates the combination of various statistical methods, in accordance with an embodiment. As used herein the term, "relate process" refers to combining various statistical methods (including for example, chi sq, Pearson correlation, and the like) to create a combined list of all relationships that exist between two or more variables, in a data set. This allows the user to simply enter the two variables, and the algorithm itself decides on how to mathematically solve the relationship, and then explains the result back to the user in plain language, without any mathematical jargon or statistics. The working starts from user inputs all variables. It may be one to many or many to many. The application runs every combination of variables (2 at a time), picks the best stat technique, and runs the mathematics, filling out the parameters as it best sees fit (based on the data in the variables). The present technology determines if a relationship exists based on statistical output. All results are listed, by order of strength. The results are explained and interpreted into plain language 400.

Figure 5:
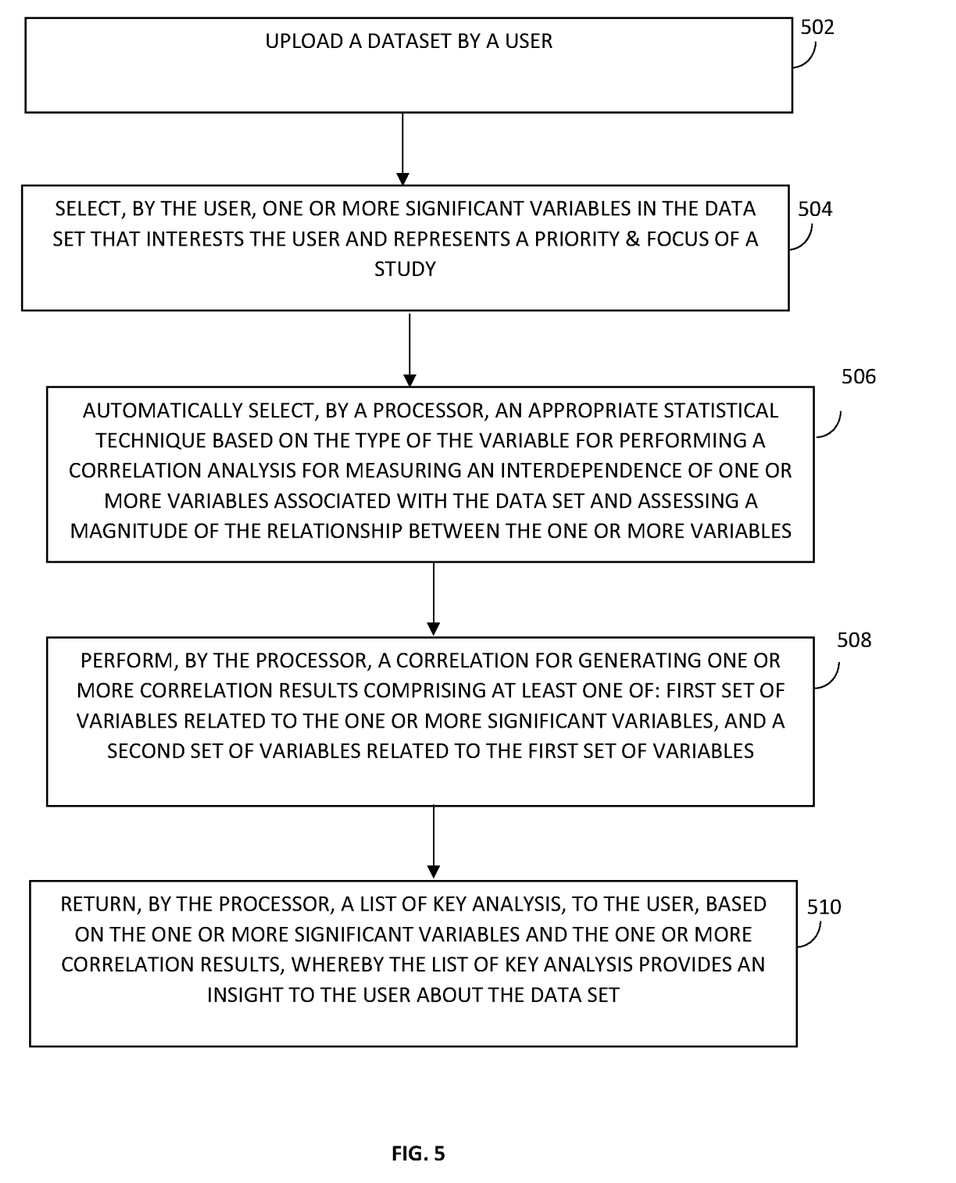
FIG. 5 illustrates flowchart for a method of analyzing a data set based on ranking of observations, in accordance with an embodiment.

FIG. 5 illustrates the flowchart of a method of ranking of the observation, in accordance with an embodiment. At step 502, the data set is uploaded by a user. At step 504, one or more significant variables in the data set is selected by the user that interests the user and represents a priority & focus of a study. At step 506, an appropriate statistical technique is automatically selected, based on the type of the variable, by a processor, for performing a correlation analysis for measuring an interdependence of one or more variables associated with the data set and assessing a magnitude of the relationship between the one or more variables. At step 508, a correlation is performed, by the processor for generating one or more correlation results comprising at least one of: a first set of variables related to the one or more significant variables, and a second set of variables related to the first set of variables. At step 510, a list of key analysis is returned by the processor to the user, based on the one or more significant variables and the one or more correlation results, whereby the list of key analysis provides an insight to the user about the data set.

Figure 6:
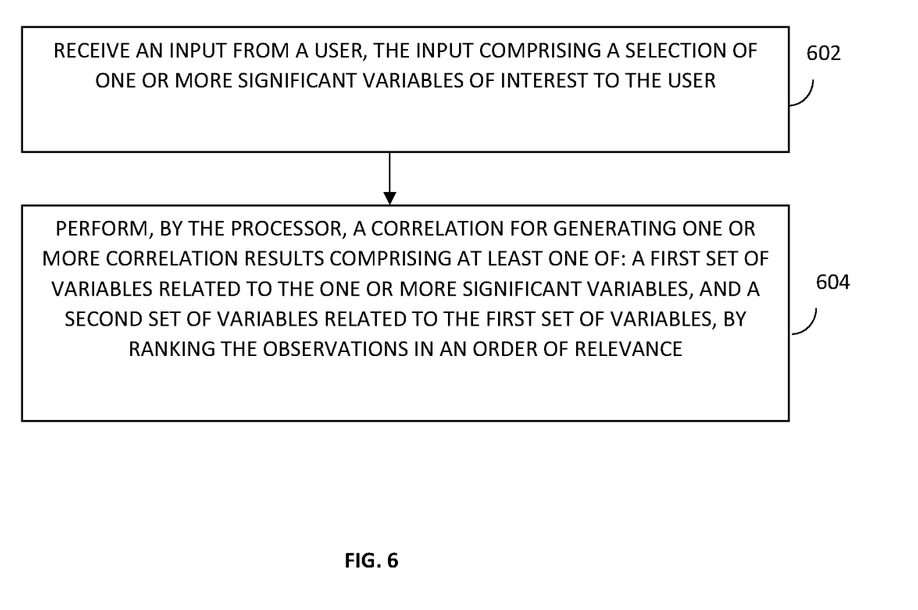
FIG. 6 illustrates a method of performing correlation of one or more variables in a database.

FIG. 6 illustrates the flowchart of a processor-implemented method of performing correlation of one or more variables in a database, in accordance with an embodiment. At step 602, an input is received from a user. The input comprises a selection of one or more significant variables of interest to the user. At step 604, a correlation is performed by the processor for generating one or more correlation results comprising at least one of: a first set of variables related to the one or more significant variables, and a second set of variables related to the first set of variables. The correlation is performed by ranking the observations in an order of relevance by classifying one or more variable observations associated with the data set based on at least one of significance to the user, the variable type, the observation nature, and the observation result. The method ranking of the observation further includes generating a list of observations and insights based on the classification. The method further includes ranking the list of observations based on a series of weights and generating by the processor a list of key analysis and one or more analysis observations based on the correlation results. The correlation is performed based on a p-value to determine if a relationship exists between the variables and if an existing relationship is one of: statistically significant or not statistically significant. The ranking score is given by the equation:

$$Ranking\_Score = (Score/Value\_Range) * Factor\_Weight$$

The Ranking_Score is assigned to each observation and the observations are ordered with the greatest Ranking_Score first.

Various embodiments of the present technology work with unselected variables. They search and find other meaningful variables not selected by the user. As it, ranks them based on their importance. They create and rank text with observations in human language. The technology ranks relationships based on other than p-value. For ranking the present technology measures the effect size or magnitude of that relationship through the selection of the most appropriate technique based on variable types.

As will be readily apparent to those skilled in the art, the present invention may easily be produced in other specific forms without departing from its essential characteristics. The present embodiments are, therefore, to be considered as merely illustrative and not restric-tive, the scope of the invention being indicated by the claims rather than the foregoing description, and all changes which come within therefore intended to be embraced therein.

A "non-transitory computer-readable medium" for purposes of embodiments of the present invention may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location or have temporal limitations. For example, a processor can per-form its functions in "real time," "offline," in a "batch mode," etc. Portions of processing can be performed at different times and at different locations, by different (or the same) processing systems.

The embodiments herein can take the form of, an entirely hardware embodiment, an entirely software embodiment or an embodiment including both hardware and software elements. The embodiments that are implemented in software include but are not limited to, firmware, resident software, microcode, and the like. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, Subscriber Identity Module (SIM) card, and cache memo-ries which provide temporary storage of at least some program code in order to reduce the number of times code must be retrieved from bulk storage during execution. Input/output (I/O) devices (including but not limited to keyboards, displays, pointing devices, remote con-trols, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening pri-vate or public networks. Modems, cable modem and Ethernet cards are just a few of the currently available types of network adapters.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recog-nize that the embodiments herein can be practiced with modifications. However, all such modifications are deemed to be within the scope of the claims. The scope of the embodiments herein will be ascertained by the claims to be submitted at the time of filing a complete specification.

What is claimed is:

1. A processor-implemented method of analysing a data set, wherein the data set includes data for a plurality of variables resulting from a study, the method comprising:
    uploading the data set by a user;
    selecting via a user interface configured to facilitate such selection, by the user, one or more significant user-selected variables from the plurality of variables in the data set based on what interests the user and represents a priority & focus of a study, thereby ignoring remaining non-user-selected variables of the plurality of variables in the data set;
    automatically selecting based on the type of the user-selected variable, by a processor, an appropriate statistical technique from a predefined library of statistical techniques for performing a correlation analysis for: (i) only measuring an interdependence of one or more user-selected variables associated with the data set and not remaining non-user-selected variables and (ii) only assessing a magnitude of the relationship between the one or more user-selected variables and not remaining non- user-selected variables;
    performing, by the processor, a correlation for generating one or more correlation results comprising at least one of: a first set of user-selected variables related to the one or more significant user-selected variables, and a second set of user-selected variables related to the first set of user-selected variables, wherein the calculation results are determined independently of one another;
    wherein performing the correlation comprises ranking the observations in an order of relevance by: classifying one or more variable observations associated with the data set based on at least one of: significance to the user, the variable type, the observation nature, and the observation result; generating a list of observations and insights based on the classification; running a relate process with two or more 1st, 2nd, and 3rd degree variables and collecting resulting observations; and compiling the observations across the data set for the two or more 1st, 2nd, and 3rd degree variables and ranking the observations by assigning a score to each observation;
    and returning, by the processor, a list of key analysis, to the user, based on the one or more significant user-selected variables and the one or more correlation results related thereto, whereby the list of key analysis provides an insight to the user about the data set based only on the one or more user-selected variables.

2. The processor-implemented method of claim 1, wherein the list of key analysis describes at least one of: frequencies, correlation, regression, benchmark reports, and recommended clusters, and wherein the list of key analysis is in the form of at least one of: a summary table, a set of charts, data tables, and plain language explanation.

3. The processor-implemented method of claim 1, wherein the interdependence of the user-selected variables is used as an indicator of whether one or more user-selected variables are related to the one or more significant user-selected variables.

4. The processor-implemented method of claim 1, further comprising automatically assigning, by the processor, individual weights to the first set of user-selected variables, the second set of user-selected variables and the one or more significant user-selected variables, observation type and analysis result based on at least the variable type.

5. The processor-implemented method of claim 1, wherein performing the correlation comprises ranking the observations in an order of relevance by: ranking the list of observations based on a series of weights that are based on pre-defined factors.

6. The processor-implemented method of claim 1, wherein the ranking score is given by the following equation:

$$\text{Ranking\_Score} = (\text{Score}/\text{Value\_Range}) * \text{Factor\_Weight}; \text{ and}$$

Wherein the Ranking_Score is assigned to each observation and the observations are ordered with the greatest Ranking_Score first.

7. The processor-implemented method of claim 1, further comprising:
    selecting a task and a describe option, by the user, via the user interface configured to facilitate such selection;
    selecting a characterize data option by the user for characterizing the data, via the user interface configured to facilitate such selection.

8. The processor-implemented method of claim 1, further comprising:
    automatically creating, by the processor, a list of meaningful observations that are equal to or higher than a predetermined score threshold, based on the list of key analysis.

9. The processor-implemented method of claim 1, wherein the correlation is performed based on a p-value to determine if a relationship exists between the user-selected variables and if an existing relationship is one of: statistically significant or not statistically significant.

10. The processor-implemented method of claim 1, wherein the observations are presented to the user in the order of importance, with the most important observations presented first and based on automated sorting via the processor.

11. A system for analysing a data set based on ranking of observations, wherein the data set includes data for a plurality of variables resulting from a study, the system comprising:

a memory comprising one or more executable modules;
and a processor configured to execute the one or more executable modules for analysing the data set based on ranking of observations, the one or more executable modules comprising:
a data module for receiving the data set and a selection of one or more significant user-selected variables from the plurality of variables via a user interface configured to facilitate such selection, wherein the one or more user-selected variables in the data set corresponds to what interests the user and represents a priority & focus of a study, thereby ignoring remaining non-user-selected variables of the plurality of variables in the data set;
a selection module for automatically selecting an appropriate statistical technique from a predefined library of statistical techniques based on the type of the user-selected variable for: (i) only performing a correlation analysis for measuring an interdependence of one or more user-selected variables associated with the data set and not remaining non-user-selected variables and (ii) only assessing a magnitude of the relationship between the one or more user-selected variables and not remaining non-user-selected variables;
a correlation module for performing a correlation for generating one or more correlation results comprising at least one of: a first set of user-selected variables related to the one or more significant user-selected variables, and a second set of user-selected variables related to the first set of user-selected variables,
wherein performing the correlation comprises ranking the observations in an order of relevance by: classifying one or more variable observations associated with the data set based on at least one of: significance to the user, the variable type, the observation nature, and the observation result; generating a list of observations and insights based on the classification; running a relate process with two or more 1st, 2nd, and 3rd degree variables and collecting resulting observations; and compiling the observations across the data set for the two or more 1st, 2nd, and 3rd degree variables and ranking the observations by assigning a score to each observation;
and an analysis module for returning a list of key analysis and one or more analysis observations, to the user, based on the one or more significant user-selected variables and the one or more correlation results, whereby the list of key analysis provides a deep insight to the user around the data set based only on the one or more user-selected variables.

12. The system of claim 11, wherein the list of key analysis describes at least one of: frequencies, correlation, regression, benchmark reports, and recommended clusters, and wherein the list of key analysis is in the form of at least one of: a summary table, a set of charts, data tables, and plain language explanation.

13. The system of claim 11, wherein the interdependence of the user-selected variables is indicative of whether one or more user-selected variables are related to the one or more significant user-selected variables selected by the user.

14. The system of claim 11, further comprising a weight assignment module for assigning a plurality of weights to user-selected variables, observation type and analysis result, wherein the plurality of weights is based on at least the variable type, and the results.

15. The system of claim 11, wherein performing the correlation comprises ranking the observations in an order of relevance by: ranking the list of observations based on a series of weights that are based on pre-defined factors.

16. The system of claim 11, wherein the ranking score is given by the following equation:

$$Ranking\_Score = (Score/Value\_Range) * Factor\_Weight;\text{ and}$$

Wherein the Ranking_Score is assigned to each observation and the observations are ordered with the greatest Ranking_Score first.

17. The system of claim 11, wherein the analysis module is further configured to:
create a list of meaningful observations based on the list of key analysis, wherein the analysis observations are in plain English language and wherein the observations are presented to the user in the order of importance, with the most important observations presented first and based on sorting via the processor.

18. A processor-implemented method of performing correlation of one or more variables in a database, wherein the data set includes data for a plurality of variables resulting from a study, the method comprising:
receiving an input from a user, the input comprising a selection via a user interface configured to facilitate such selection of one or more significant user-selected variables of interest to the user among the plurality of variables of the data set;
automatically selecting based on the type of the user-selected variable, by a processor, an appropriate statistical technique from a predefined library of statistical techniques for performing a correlation analysis for: (i) only measuring an interdependence of one or more user-selected variables associated with the data set and not remaining non-user-selected variables and (ii) only assessing a magnitude of the relationship between the one or more user-selected variables and not remaining non-user-selected variables;
performing, by the processor, a correlation for generating one or more correlation results comprising at least one of: a first set of user-selected variables related to the one or more significant user-selected variables, and a second set of user-selected variables related to the first set of user-selected variables;
wherein performing the correlation comprises ranking the observations in an order of relevance by: classifying one or more variable observations associated with the data set based on at least one of: significance to the user, the variable type, the observation nature, and the observation result; generating a list of observations and insights based on the classification; running a relate process with two or more 1st, 2nd, and 3rd degree variables and collecting resulting observations; and compiling the observations across the data set for the two or more 1st, 2nd, and 3rd degree variables and ranking the observations by assigning a score to each observation;
by ranking the observations in an order of relevance by:
a) classifying one or more variable observations associated with the data set based on at least one of: significance to the user, the variable type, the observation nature, and the observation result;
b) generating a list of observations and insights based on the classification;
and c) ranking the list of observations based on a series of weights;
and and returning, by the processor, a list of key analysis, to the user, based on the one or more significant user-selected variables and the one or more correlation results related thereto, whereby the list of key analysis provides an insight to the user about the data set based only on the one or more user-selected variables.

19. The processor-implemented method of claim 18, wherein the ranking score is given by the following equation:

Ranking_Score=(Score/Value_Range)*Factor_Weight; and wherein the Ranking_Score is assigned to each observation and the observations are ordered with the greatest Ranking_Score first.

20. The processor-implemented method of claim 18, wherein the correlation is performed based on a p-value to determine if a relationship exists between the user-selected variables and if an existing relationship is one of: statistically significant or not statistically significant.

* * * * *